Sept. 13, 1966   S. D. F. NILSSON   3,272,433
THERMOSTATIC VALVES

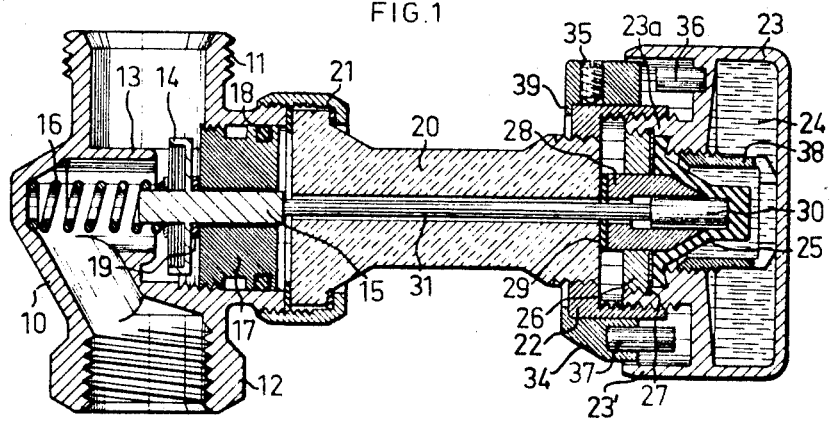
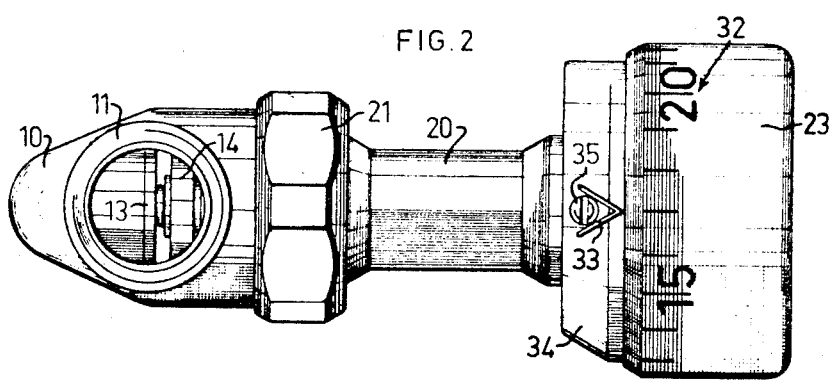
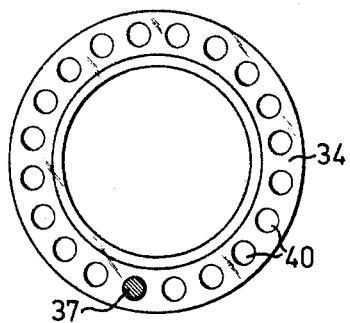

Filed July 6, 1964   2 Sheets-Sheet 2

Sven David Ferdinand Nilsson
Inventor

By Wenderoth, Lind and Ponack
Attorneys

3,272,433
THERMOSTATIC VALVES
Sven David Ferdinand Nilsson, Markaryd, Sweden, assignor to AB Markaryds Metallarmatur, Markaryd, Sweden
Filed July 6, 1964, Ser. No. 380,225
Claims priority, application Sweden, July 9, 1963, 7,615/63; Dec. 10, 1963, 13,687/63; Dec. 18, 1963, 14,099/63
14 Claims. (Cl. 236—99)

This invention relates to a thermostatic valve comprising a valve body with seat and valve member, a thermostat supported by the valve body through heat insulating means and having a liquid-filled container serving as sensing means, said container being operatively connected via actuating means to the valve member in order to actuate said member responsive to the temperature prevailing in the thermostat environment, and a manually adjustable knob for varying the volume of the container the boundary wall of which is formed to a major portion by the knob which is substantially freely exposed to the surrounding air.

Such thermostatic valves are employed inter alia in central heating plants in which hot water circulates, to provide an individual temperature control in the premises heated by said central heating plant, the thermostatic valves being disposed on the radiators instead of the otherwise customary shut-off and control valves.

The invention has for its object to provide a thermostatic valve of the type referred to in the introduction, which is simpler and thus cheaper and more reliable than the hitherto available valves of such type, said improved thermostatic valve being more sensitive and permitting by reason of a larger valve movement a more exact control and adjustment than do the previously known valves.

According to the invention, the characterizing features of such a thermostatic valve reside in that the boundary wall of the container is additionally formed by a diaphragm operatively coacting with the actuating means and permitting the sensing means which in a per se known manner is a liquid to expand and contract in the container, and that a piston is arranged to vary the volume of the container, said piston engaging the diaphragm and being axially movable in relation to the container by rotation of the knob for causing the piston to urge the diaphragm a greater or lesser distance into the liquid-filled interior of the container.

For better elucidation, the invention will be described in some embodiments, chosen by way of example, with reference to the accompanying drawings in which:

FIG. 1 is an axial section of a thermostatic valve according to the invention;

FIG. 2 is a plan view of the valve in FIG. 1;

FIG. 3 is an end view of a calibration and abutment ring disposed on the valve;

Figure 4:
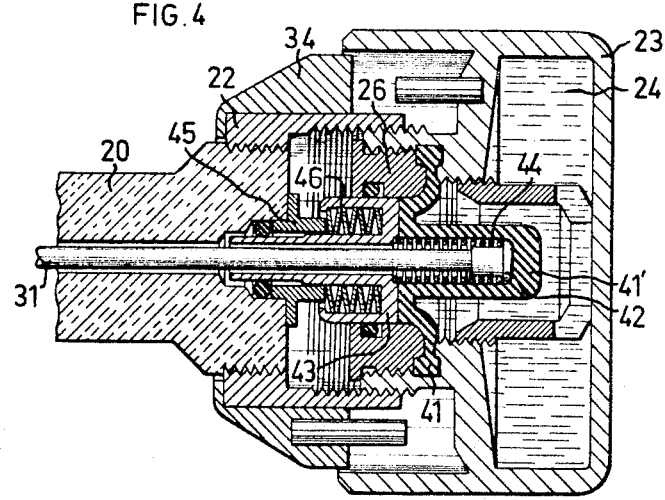
FIG. 4 is an axial section of the thermostat proper in a modified form thereof.

The thermostatic valve illustrated in FIGS. 1–3 comprises a valve body 10 having connection sockets 11 and 12 for the connection of the thermostatic valve in a pipeline in which said thermostatic valve is to control the flow of a fluid medium. The valve body has a valve seat 13 formed therein, and a valve disk 14 disposed on a valve stem 15 and biased into open position by a coil spring 16 coacts with the seat 13. The valve stem 15 is axially movable in a presetting piston 17 which is screwed into and sealed with respect to the valve body by an O-ring 18. This presetting piston determines the extreme open position of the valve disk and is screwable for axial displacement and for adjustment of said position. A counter-packing 19 is arranged around the valve stem 15 between the valve disk 14 and the presetting piston 17.

A heat insulator 20 in the form of an elongate sleeve is attached with one end to the valve body coaxially with the valve stem 15 by means of a coupling nut 21, while a sleeve-shaped fastening element 22 for the thermostat is screwed onto the other end of the heat insulator 20. The main portion of the thermostat is constituted by a cylindrical knob 23 which has a threaded hub portion 23a engaging the fastening element 22 and which is supported by said fastening element. The knob is in the form of a cylindrical container having an inner chamber 24 for the sensing medium of the thermostat, which in a per se known manner is a liquid, for example spindle oil. The boundary wall of said chamber is formed in part by a substantially frustoconical rubber diaphragm 25 which has its large end secured in the hub portion 23a of the knob with the aid of a nut 25 and an intermediary washer 27 and penetrates into the chamber 24. An adjustment piston 28 has a conical end portion inserted in the frustoconical recess of the rubber diaphragm 25 and is held pressed against the heat insulator 20 with a packing 29 between the adjustment piston and the heat insulator. By screwing the knob 23 on the fastening element 22 and thereby displacing it axially the diaphragm 25 can be urged by the adjustment piston 28 to a greater or lesser extent into the chamber 24 to vary the volume available to the liquid.

An actuating piston 30 is mounted on a piston rod 31 of a material having a low coefficient of thermal expansion and low heat conductivity, for example Kanthal. The actuating piston 30 is movably guided in the adjustment piston 28 and adapted to bear with its rod end against the valve stem 15 and to actuate it. The piston rod 31 extends through the heat insulator 20, and the clearance between the piston rod and the insulator is filled with silicone fat. A force-locking connection (engagement) is maintained between the piston rod and the valve stem by the force exerted on these parts by the coil spring 16 and the elasticity of the rubber diaphragm 25. The actuating piston 30 is received in the hollow of the diaphragm in the small end thereof.

The position of the valve member 14 is dependent on the temperature of the liquid in the chamber 24 inasmuch as the liquid, when its temperature rises, increases in volume and urges the diaphragm 25 out of the chamber 24 to an extent responsive to the temperature rise so that the actuating piston 13 is moved to the left as viewed in FIG. 1 and actuates via its piston rod 31 the valve disk 14 which is pushed against its seat 13 to throttle the flow through the valve and is possibly closed altogether. In case the temperature of the liquid sinks instead, the liquid decreases in volume so that the coil spring 16 is able to urge the diaphragm 25 farther into the chamber 24 via the piston rod 31 and the piston 30 whereby the valve disk 14 is moved away from the seat 13 and the flow through the valve is increased. The temperature of the liquid very closely follows that of the environment because the boundary walls of the chamber 24 containing the liquid to a major portion are freely accessible to the surrounding air, for the circumferential wall and end wall of the knob 23 are entirely exposed. The medium flowing through the valve has an insignificant and practically no influence at all on the temperature of the liquid since the thermostat is connected to the valve in a heat insulating manner.

Adjustment of the temperature at which the thermostat closes the valve entirely, is performed by rotation of the knob 23. To facilitate the adjustment of the temperature, the knob has its circumference equipped with a graduation 32 which is read against an index 33. Said index is disposed on a ring 34 which is mounted for rotation on the fastening element 22 but can be fixed in adjusted position by means of a screw 35, thus permitting the index 33 to be turned, for calibration of the thermostatic valve, to the position opposite the temperature at which the valve closes, and then to be secured in this position.

The calibration ring 34 is preferably made from a heat insulating material such as polyethylene, polytetrafluorethylene or nylon in order that it may impede transfer of radiation heat from the valve body to the sensing means. The ring 34 can be pulled off the fastening element 22 in an axial direction to the left as viewed in FIG. 1 when the screw 35 has been untightened. The distance the ring can be moved inwardly over the fastening element 22 is restricted by a radially inwardly directed annular flange 39 on said ring. In fully mounted position the ring 34 is partly overlapped by a collar 23' on the knob 23.

In its end surface facing the knob 23 (see FIG. 3) the ring 34 has a number of uniformly spaced axial dead end holes 40 in which there can be removably mounted one or more abutment pins 37 which in coaction with an abutment pin 36 on the knob 23 determine the adjusting range of the knob. This arrangement has been made to prevent damage to the rubber diaphragm 25 by rotation of the knob revolution by revolution, thus urging the adjusting piston 28 too far a distance into the diaphragm. With a single pin 37 the adjusting range will be almost 360°. However, two pins can be mounted for restricting the adjusting range to a considerably smaller part of a revolution, which is sometimes desirable, particularly in schools, hospitals and official institutes where a lot of people convene and it may happen that an unauthorized person turns the knob, as well as in premises where it is essential that a variation of the temperature can be performed merely within narrow limits. If two abutment pins 37 are placed each in a hole on either side of a single intermediate hole opposite which the abutment pin 36 is placed, the knob is fixed in the adjusted position. The abutment pins 36 and 37 are concealed by the collar 23' so as not to be accessible, but as the ring 34 is axially removable from the fastening element 22 after the screw 35 has been loosened, access is easily gained to the end surface of the ring facing the knob for repartition of the pins 37 mounted therein when it is desired to change the adjusting range of the thermostatic valve.

In order that the knob 23 serving as a liquid container may not be permanently deformed if the temperature of the liquid should become exceptionally high, the end wall of the knob is formed in the manner of a cup spring so that at an exceptionally high temperature it is able to resiliently yield under the pressure of the liquid after the valve disk 14 has been brought into closed position against the seat 13, and after a more normal temperature has been reached said end wall may then return to its initial position. The end wall of the knob 23 or chamber 24 should not, however, have this possibility of deforming during the normal function of the thermostatic valve, and for this reason the end wall is subject to a certain bias which is brought about by means of a biasing screw 38 screwed into the hub portion 23a and engaging the end wall of the knob 23. The bias of the end wall is regulated by applying the screw 38 more or less firmly against the inner side of the end wall. The biasing screw is perforated in order that the chamber 24 may not be divided into mutually separated part chambers.

When the diaphragm at temperature changes moves owing to the expansion or contraction of the liquid in the container the resulting movement may be impeded to some extent since the diaphragm will bulge toward the actuating piston or other parts of the thermostatic valve under the effect of a force exerted on the diaphragm so that the movements thereof are subjected to great friction. As a consequence, the control provided by the thermostatic valve will not be exact. The modifications shown in FIGS. 4 and 5 are suggested to avoid this drawback.

According to FIG. 4 the rubber diaphragm has a central dome-shaped portion 41' and a peripheral disk-shaped portion 41 with which it is secured in the knob 23 by means of the nut 26 screwed thereinto. The piston rod 31 passing axially through the heat insulator 20 is received in the dome-shaped portion 41' of the diaphragm. The piston rod 31 may be composed of a number of relatively rotatable parts. At its end engaging the bottom of the dome-shaped portion 41' the piston rod has a cylindrical head 42. A coil spring 44 which constitutes a lining within said dome-shaped portion 41' is interposed between the cylindrical head 42 and an abutment 43 serving as an adjusting piston. The coil spring 44 allows the diaphragm to move in the axial direction of the piston rod 31 under the action of the expansion and contraction of the liquid, but on the other hand prevents the dome-shaped portion from being pressed against the piston rod by radially directed deformation forces, that arise during said expansion and contraction, and from exerting an impeding frictional force on the piston rod. The abutment 43 may be fixedly arranged in the heat insulator 20 but may also, as is shown in FIG. 4, be designed as a piston axially movable in the nut 26 and a support 45 fixedly mounted on the heat insulator 20 and forming an abutment for a set of conical cup springs 46, which is accommodated in an annular recess in the abutment 43 and is interposed between the latter and the support 45. This set of springs has a high stiffness considerably higher than that of the spring 44 so that the abutment 43 normally functions as a stationary abutment but is able to yield axially under exceptional circumstances if the pressure exerted by the liquid in the chamber 24 via the diaphragm 41, 41' rises too much, for example because the thermostatic valve is adjusted by a manual rotation of the knob 23 for a considerably lower temperature than that which the environment momentarily has. The set of springs 46 and the movable abutment 43 thus constitute, like the resilient end wall of the knob 23, a safety device for preventing that the component parts of the thermostatic valve are destroyed or damaged by improper manual adjustment of the thermostatic valve.

Figure 5:
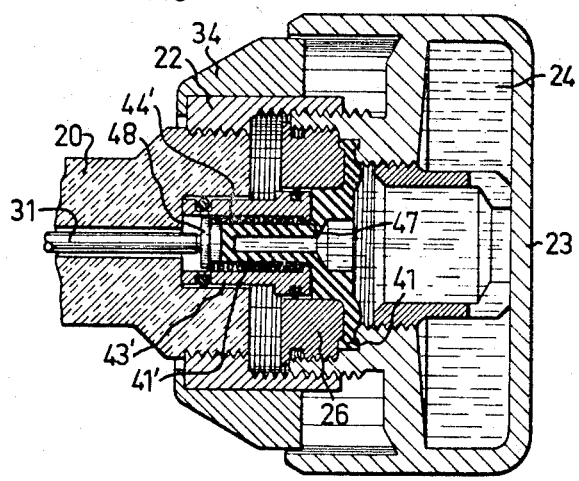
FIG. 5 is an axial section similar to FIG. 4 of a further modified form of the thermostat.

The embodiment shown in FIG. 5 is of the same type as that in FIG. 5 but differs from it in that the diaphragm is otherwise designed. Thus the dome-shaped portion 41' faces in the opposite direction to what is shown in FIG. 4 so as to project in the manner of a stud toward the piston rod 31. This stud 41' is embraced by a coil spring 44' which forms an outer casing on said stud and serves to guide the stud under low friction in a bore in the abutment 43' which is arranged as an adjusting piston, fixedly mounted in the heat insulator 20 and has in its end facing the diaphragm an internal shoulder 47. The coil spring 44' is interposed between this shoulder and a washer 48 which is placed as a pressure washer between the end of the stud 41' and the end of the piston rod 31 facing the stud, and prevents the stud 41' from being radially widened into engagement with the inner side of the abutment 43' when axial pressure is exerted on the stud 41'.

What I claim and desire to secure by Letters Patent is:

1. Thermostatic valve including a valve body forming an internal valve seat, a valve member slidably guided by said valve body for cooperation with said valve seat, a thermostat comprising a container the interior of which is filled with a liquid serving as a sensing means, heat insulating means supporting said thermostat on said valve body, actuating means operatively connecting said thermostat to said valve member in order to actuate said valve member responsive to the temperature prevailing in the thermostat environment, a manually adjustable knob for varying the volume of said container, said knob being substantially freely exposed to the surrounding air and forming a major part of the boundary wall of said container, a diaphragm forming another part of said boundary wall of said container and permitting by its yielding the liquid in said container to expand and contract in the container, said diaphragm operatively engaging said actuating means to convey to said actuating means the expansion and contraction movements of said liquid, a piston engaging the diaphragm, means mounting said knob and said piston for relative axial movement by rotation of the knob thereby to regulate by movement of said diaphragm the volume of the interior of said container, said diaphragm forming a cylindrical circumferential surface substantially coaxial with said actuating means and which further comprises a coil spring mounted to said diaphragm and covering said surface, said coil spring being adapted to take up substantially radial deformation forces arising in the diaphragm by the pressure of the sensing means while permitting the movements of the sensing means and the actuating means in the axial direction of said actuating means.

2. Thermostatic valve as claimed in claim 1 in which said diaphragm forms a recess receiving said actuating means and in which said coil spring is provided as a lining in said recess.

3. Thermostatic valve as claimed in claim 2 comprising an abutment for said spring and a head on said actuating means, said coil spring being interposed between said abutment and said head.

4. Thermostatic valve as claimed in claim 1 in which said diaphragm forms an axial stud, said coil spring being arranged as a casing on said stud.

5. Thermostatic valve as claimed in claim 4 comprising an abutment for said coil spring and a washer mounted at the end of said stud, said coil spring being interposed between said abutment and said washer, said actuating means engaging said washer.

6. Thermostatic valve as claimed in claim 5 comprising means forming a bore for receiving said stud, said coil spring being movably guided in said bore.

7. Thermostatic valve including a valve body forming an internal valve seat, a valve member slidably guided by said valve body for cooperation with said valve seat, a thermostat comprising a container the interior of which is filled with a liquid serving as a sensing means, heat insulating means supporting said thermostat on said valve body, actuating means operatively connecting said thermostat to said valve member in order to actuate said valve member responsive to the temperature prevailing in the thermostat environment, a manually adjustable knob for varying the volume of said container, said knob being substantially freely exposed to the surrounding air and forming a major part of the boundary wall of said container, a diaphragm forming another part of said boundary wall of said container and permitting by its yielding the liquid in said container to expand and contract in the container, said diaphragm operatively engaging said actuating means to convey to said actuating means the expansion and contraction movements of said liquid, a piston engaging the diaphragm, means mounting said knob and said piston for relative axial movement by rotation of the knob thereby to regulate by movement of said diaphragm the volume of the interior of said container, said knob forming a cylinder having an end wall formed as a cup spring and which further comprises a screw engageable with said end wall to regulate the bias thereof.

8. Thermostatic valve including a valve body forming an internal valve seat, a valve member slidably guided by said valve body for cooperation with said valve seat, a thermostat comprising a container the interior of which is filled with a liquid serving as a sensing means, heat insulating means supporting said thermostat on said valve body, actuating means operatively connecting said thermostat to said valve member in order to actuate said valve member responsive to the temperature prevailing in the thermostat environment, a manually adjustable knob for varying the volume of said container, said knob being substantially freely exposed to the surrounding air and forming a major part of the boundary wall of said container, a diaphragm forming another part of said boundary wall of said container and permitting by its yielding the liquid in said container to expand and contract in the container, said diaphragm operatively engaging said actuating means to convey to said actuating means the expansion and contraction movements of said liquid, a piston engaging the diaphragm, means mounting said knob and said piston for relative axial movement by rotation of the knob thereby to regulate by movement of said diaphragm the volume of the interior of said container, a ring rotatably mounted on said thermostat adjacent said knob, an index on said ring, means for securing said ring in adjusted rotational position relative to said knob, and a graduation on said knob, said index and said graduation cooperating to indicate the position of said knob.

9. Thermostatic valve as claimed in claim 8 in which said ring provides a plurality of peripherally spaced axial dead end holes in an end surface formed by said ring and facing said knob, and which further comprises in at least one of said dead end holes an abutment pin and on said knob an abutment, said abutment pin and said abutment cooperating to restrict the rotational movement of said knob.

10. Thermostatic valve is claimed in claim 9 in which said abutment pin is removably mounted in one of said dead end holes.

11. Thermostatic valve as claimed in claim 10 in which said ring is pushed from outside axially onto said thermostat toward said knob.

12. Thermostatic valve as claimed in claim 11 in which said ring forms a radially inwardly directed peripheral flange for restricting the distance that it can be passed onto the thermostat.

13. Thermostatic valve including a valve body forming an internal valve seat, a valve member slidably guided by said valve body for cooperation with said valve seat, a thermostat comprising as a sensing means a container which is to a substantial extent freely exposed to the surrounding air and the interior of which is filled with a liquid, means supporting said thermostat on said valve body, actuating means operatively connecting said thermostat to said valve member in order to actuate said valve member responsive to the temperature prevailing in the thermostat surroundings, a diaphragm forming part of the boundary wall of said container and permitting by its yielding the liquid in said container to expand and contract in the container, a sleeve piston engaging said diaphragm, said actuating means extending through said piston and operatively engaging said diaphragm to convey to said valve member the expansion and contraction movements of said liquid, and means mounting said container for axial movement in relation to said piston by manual rotational movement of said container, said diaphragm thereby being engageable with said piston to vary the volume of the interior of said container by regulated inward pressing of said diaphragm by said piston.

14. Thermostatic valve as claimed in claim 13 comprising an abutment for said piston at the end thereof remote from said diaphragm, and spring biasing means yieldably supporting said abutment, said spring biasing means being adjustable to allow said abutment to yield only at excessive load on said piston.

References Cited by the Examiner

UNITED STATES PATENTS

| | | | |
|---|---|---|---|
| 934,632 | 9/1909 | Sandvoss | 236—99 |
| 1,794,612 | 3/1931 | Halsey | 236—42 |
| 2,076,406 | 4/1937 | Kern | 236—16 |
| 2,847,033 | 8/1958 | Baker | 92—84 |

FOREIGN PATENTS 1,136,173   9/1962   Germany.

ALDEN D. STEWART, *Primary Examiner.*